(12) United States Patent
Panigrahy et al.

(10) Patent No.: US 10,642,789 B2
(45) Date of Patent: May 5, 2020

(54) EXTENDED ATTRIBUTE STORAGE

(71) Applicant: HEWLETT PACKARD ENTERPRISE DEVELOPMENT LP, Houston, TX (US)

(72) Inventors: Padmagandha Panigrahy, Bangalore (IN); Abhay Sachan, Bangalore (IN); Chaitanya Narra, Bangalore (IN); Amarish Shapur Venkateshappa, Bangalore (IN); Venkataraman Kamalaksha, Bangalore (IN); Anil Kumar Boogarapu, Bangalore (IN); Rajagopal Chellam, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 167 days.

(21) Appl. No.: 15/521,561

(22) PCT Filed: Jan. 15, 2015

(86) PCT No.: PCT/US2015/011564
§ 371 (c)(1),
(2) Date: Apr. 24, 2017

(87) PCT Pub. No.: WO2016/069035
PCT Pub. Date: May 6, 2016

(65) Prior Publication Data
US 2017/0316024 A1 Nov. 2, 2017

(30) Foreign Application Priority Data

Nov. 1, 2014 (IN) .......................... 5486/CHE/2014

(51) Int. Cl.
*G06F 16/20* (2019.01)
*G06F 16/13* (2019.01)
*G06F 3/06* (2006.01)

(52) U.S. Cl.
CPC .......... *G06F 16/137* (2019.01); *G06F 3/0604* (2013.01); *G06F 3/064* (2013.01); *G06F 3/0673* (2013.01); *G06F 16/13* (2019.01)

(58) Field of Classification Search
None
See application file for complete search history.

(56) References Cited

U.S. PATENT DOCUMENTS

| | | |
|---|---|---|
| 5,628,007 A | 5/1997 | Nevarez |
| 6,850,929 B2 | 2/2005 | Chang et al. |

(Continued)

OTHER PUBLICATIONS

Anderson, C., "xFS Attribute Manager Design," (Research Paper), SGI Developer Central Open Source, 1993, 15 pages, available at http://linux-xfs.sgi.com/projects/xfs/design_docs/xfsdocs93_pdf/attributes.pdf.

(Continued)

*Primary Examiner* — Belix M Ortiz Ditren
(74) *Attorney, Agent, or Firm* — Hewlett Packard Enterprise Patent Department (57) ABSTRACT

In one example, a request for storage of an extended attribute (EA) of a file system object is received. A storage location for the EA is determined from a plurality of storage locations, based on one or more characteristics of the EA, the plurality of storage locations including an inode, a first storage file accessible by a first B+ tree, and a second storage file accessible by a second B+ tree. The EA is accordingly stored in the determined storage location.

16 Claims, 9 Drawing Sheets

(56) References Cited

U.S. PATENT DOCUMENTS

| | | | |
|---|---|---|---|
| 7,809,868 B1* | 10/2010 | Mu | G06F 3/0604 710/74 |
| 2002/0129028 A1* | 9/2002 | Chang | G06F 16/10 |
| 2005/0055360 A1 | 3/2005 | Chang et al. | |
| 2006/0248088 A1 | 11/2006 | Kazar et al. | |
| 2007/0168398 A1* | 7/2007 | Miroshnichenko | G06F 16/10 |
| 2008/0101194 A1* | 5/2008 | Ohashi | G11B 27/24 369/84 |
| 2010/0049755 A1 | 2/2010 | Best et al. | |
| 2013/0013561 A1 | 1/2013 | Chan et al. | |
| 2013/0166831 A1 | 6/2013 | Atkisson et al. | |
| 2014/0019680 A1 | 1/2014 | Jin et al. | |
| 2014/0136483 A1 | 5/2014 | Chaudhary et al. | |

OTHER PUBLICATIONS

Staereling, R.V.H.V. et al., "Efficient, Modular Metadata Management with Loris," (Research Paper), Jun. 8, 2011, 10 pages, available at http://www.cs.vu.nl/~dcvmoole/docs/NAS2011.pdf.

Watson, R., "Introducing Supporting Infrastructure for Trusted Operating System Support in FreeBSD," (Research Paper) BSD Conference, Sep. 8, 2000, 29 pages, available at http://www.trustedbsd.org/docs.html.

International Search Report and Written Opinion received for PCT Patent Application No. PCT/US2015/011564, dated Jun. 24, 2015, 9 pages.

International Preliminary Report on Patentability received for PCT Patent Application No. PCT/US2015/011564, dated May 11, 2017, 8 pages.

"NTFS Directories and Files", available online at <https://web.archive.org/web/20140521082228/http://www.dewassoc.com/kbase/windows_nt/ntfs_directories_and_files.htm>, May 21, 2014, 6 pages.

Brian Dewey, "Understanding ACLs in NTFS", available online at <https://blogs.msdn.microsoft.com/brian_dewey/2004/01/20/understanding-acls-in-ntfs/>, Jan. 20, 2004, 18 pages.

Flipdoubt et al., "Where does Windows store ACLs and do ACLs follow a file from one machine to another?", available online at <https://stackoverflow.com/questions/839625/where-does-windows-store-acls-and-do-acls-follow-a-file-from-one-machine-to-anot1/2>, May 2009, 2 pages.

NTFS.com, "How the System Uses ACLs", available online at <https://web.archive.org/web/20140701101204/http://www.ntfs.com/ntfs-permissions-acl-use.htm>, Jul. 1, 2014, 4 pages.

* cited by examiner

Fig. 6

EXTENDED ATTRIBUTE STORAGE

BACKGROUND

File systems are generally implemented in computing systems to handle data storage and retrieval using data storage devices. File systems handle data in the form of file system objects, such as files and directories. Each file system object is associated with metadata that is used for manipulation and maintenance of the file system object. The metadata can include regular attributes and extended attributes. While regular attributes have a purpose and size defined by the file system, extended attributes can be used to store additional information about the file system object, which may not be covered by the regular attributes. The extended attribute may be system defined or user defined and can vary in size. For example, extended attributes can be used to store information, such as author of a document, cryptographic hash, checksum, digital signature, and access control list.

BRIEF DESCRIPTION OF FIGURES

The detailed description is described with reference to the accompanying figures. In the figures, the left-most digit(s) of a reference number identifies the figure in which the reference number first appears. The same numbers are used throughout the figures to reference like features and components. Systems and/or methods, in accordance with examples of the present subject matter are now described, by way of example, and with reference to the accompanying figures, in which.

DETAILED DESCRIPTION

Aspects of the present subject matter relate to systems and methods for storing extended attributes (EAs) corresponding to file system objects managed by a file system. A file system organizes and stores data as file system objects on a storage device, such as a disk. The file system objects may include files, directories, and the like, and may be stored in a plurality of data storage units of the storage device, such as blocks of the disk. While the description herein is provided with reference to files as an example, it will be understood that the description is applicable to other file system objects also.

Generally, a file may be stored in multiple blocks of a storage disk. The list of the blocks associated with the file can be maintained in an index node, also referred to as an inode, associated with the file. In one example, the inode can also include metadata associated with the file. As mentioned earlier, the metadata associated with the file can include extended attributes (EAs) stored as key-value pairs and containing additional information with respect to the file. Storing EAs in inodes provides faster access to a file's metadata, thereby increasing the file system's performance. However, while the size of the EAs can vary, the size of the inode is usually predefined and hence the inode may not be able to handle large sized EAs or EAs of a large number of files, thereby reducing scalability.

In another example, the EAs may be stored in other blocks of the storage disk accessible via data structures, such as B+ trees. A B+ tree is generally a tree data structure having keys stored in internal nodes and data pointers corresponding to the keys stored in leaf nodes, with the leaf nodes being linked serially. While the use of the B+ tree structure provides for scalability, the data latency during storage and retrieval increases because the B+ tree structure has to be traversed each time for accessing an EA. Moreover, while B+ trees allow block level de-duplication of the EAs, there may be duplicate EAs present at the file system object level, resulting in an inefficient use of memory space.

Aspects of the present subject matter relate to a system and a method for storage of EAs associated with file system objects managed by a file system. The present subject matter provides a multi-layer EA storage framework. In one implementation, the multi-layer EA storage framework includes an inode, a first B+ tree, and a second B+ tree. In one example, the inode can be a secondary inode that is co-located with the primary inode of the file system, thus allowing the primary inode to be used for storing regular attributes and other information related to the file system objects. In another example, the secondary inode may be contiguous to the primary inode. In one example, the number and sizes of secondary inodes contiguous to the primary inode can be provided by a user, such as a system administrator, when the file system is created. Further, since the secondary inodes are contiguous to the primary inode, storage and retrieval of EAs in the secondary inodes can be done quickly.

In one example, the first B+ tree can be a de-duplicated B+ tree which can implement a file system object level de-duplication mechanism for an EA to use memory space efficiently. In one example, the second B+ tree can be a per-object B+ tree which stores multiple EAs for a files system object and allows for scalability of the EA storage framework.

In one implementation, the system and method of the present subject matter can determine the storage location for each EA from the inode, a first storage file accessible via the first B+ tree, and a second storage file accessible via the second B+ tree, based on characteristics of the EA, such as name of the EA and a user defined characteristic. For example, a frequently accessed EA may be stored in the inode for fast access, while an EA with a high possibility of duplication may be stored using the de-duplicated B+ tree for efficient storage. Further, a large sized EA with low or no de-duplication possibility may be stored using the per-object B+ tree for scalability. As a result, different EAs for a file may be stored in different layers of the multi-layer EA storage framework so that the overall EA storage and retrieval can be made scalable and efficient, with reduced or minimal data latency.

The above systems and methods are further described in conjunction with appended figures. It should be noted that the description and figures merely illustrate the principles of the present subject matter. It will thus be appreciated that various arrangements that embody the principles of the present subject matter, although not explicitly described or shown herein, can be devised from the description and are included within its scope. Furthermore, all examples recited herein are for pedagogical purposes to aid the reader in understanding the principles of the present subject matter. Moreover, all statements herein reciting principles, aspects, and examples of the present subject matter, as well as specific examples thereof, are intended to encompass equivalents thereof.

Figure 1A:
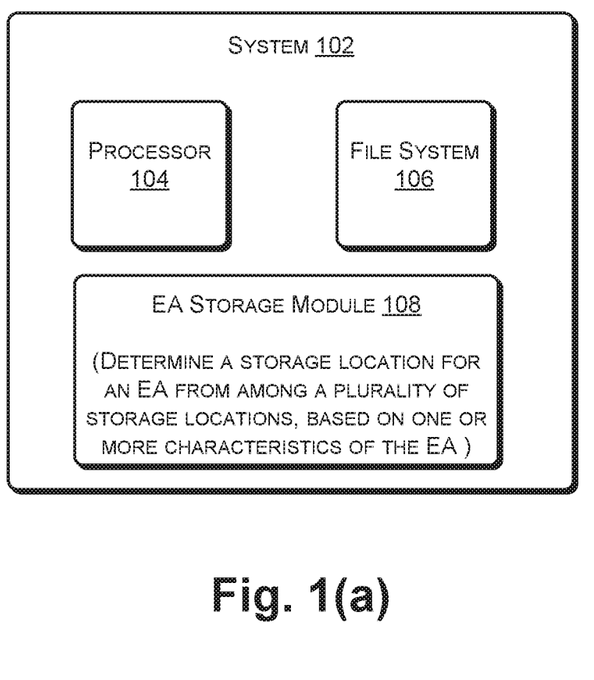
FIG. 1(a) illustrates an example system for extended attribute storage, in accordance with an example of the present subject matter.

FIG. 1(a) illustrates a block diagram of an example system 102 for extended attribute storage, in accordance with an example of the present subject matter. The system 102 may be implemented in, for example, desktop computers, multiprocessor systems, personal digital assistants (PDAs), laptops, network computers, cloud servers, mini-computers, mainframe computers, and hand-held devices, such as tablets.

The system 102 may include, for example, processor(s) 104, a file system 106 communicatively coupled to the processor 104, and an EA storage module 108 communicatively coupled to the processor 104 and the file system 106.

The processor(s) 104 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

The file system 106 can control how data and metadata related to the data is stored on a storage device (not shown in this figure). For example, the file system 106 can be implemented by an operating system of the system 102 to manage the storage of data on the storage device. It will be understood that the file system 106 can be of any type depending on the storage device used and the system 102 in which the file system 106 is implemented. For example, the file system 106 can be a network file system, an optical disk file system, a flat file system, a database file system, a tape file system, etc.

In one implementation, the file system 106 can store the data as file system objects and can use metadata to access, manage, and manipulate the file system objects. The file systems objects can include, for example, files, records, and directories. The metadata can include attributes that describe the file system objects, such as date of creation, date of modification, author, access control list (ACL), etc. Some of the attributes can be regular attributes, such as date of creation and date of modification, defined by the file system 106 for each file system object. Other attributes can be extended attributes (EAs) that provide additional information about the file system objects and may be defined by the file system 106 or by a user, such as a system administrator, through a user interface (UI) provided by the file system 106. Further, each file system object may have one or more EAs of varying sizes associated with it.

Each EA of a file system object can include a key-value pair, where the key is indicative of the name of the EA and the value corresponds to the value of the EA for the file system object. For example, if author of a file is XYZ, the EA corresponding to author's name can include a key that indicates the name of the EA, i.e., "author", and the value can be the author's name "XYZ".

Further, the file system 106 can manage storage and retrieval of EAs via the EA storage module 108. In operation, the file system 106 can receive a request to store an EA corresponding to a file system object. In one example, the request can be generated by a user through a UI provided by the file system 106. In another example, the request can be generated automatically when the file system 106 defines an EA that then has to be stored. The file system 106 can communicate the request to the EA storage module 108. The EA storage module 108 can determine a storage location for the EA from among a plurality of storage locations, based on one or more characteristics of the EA.

The characteristics of the EA can include at least one of a name of the EA, a user defined characteristic indicative of the storage location, and a size of the EA. The user defined characteristic can be for example, an occurrence of a word or sequence of characters in the EA name, such as "de-dup". It will be understood that other characteristics, such as a frequency of access and a de-duplication characteristic indicative of a possibility of de-duplication, may be additionally used.

The plurality of storage locations can include an inode, a first storage file accessible by a first B+ tree, and a second storage file accessible by a second B+ tree. In one example, the inode can be one of a plurality of secondary inodes that are contiguous to or co-located with a primary inode and are created for storage of EAs. In another example, the inode can be the primary inode itself. The first B+ tree can be a B+ tree that de-duplicates and stores EA values for a particular EA for multiple file system objects handled by the file system 106. Thus, the first B+ tree can be a file system wide de-duplicated B+ tree. The second B+ tree can be a B+ tree that stores EAs for a particular file system object handled by the file system 106. Thus, the second B+ tree can be a per-object B+ tree.

In one example, the EA storage module 108 stores the EA in the first storage file if the one or more characteristics of the EA indicate that de-duplication of the EA is to be performed. In this example, the first B+ tree implements a de-duplication mechanism for efficient memory usage as will be discussed later. In another example, the EA storage module 108 stores the EA in the inode if the one or more characteristics of the EA indicate that the EA is to be stored in the inode or if the size of the EA is such that the EA can be stored in the inode. In yet another example, the EA is stored in the second B+ tree if the one or more characteristics do not indicate that the EA is to be de-duplicated or stored in the inode and if the size of the EA is such that the EA may not be stored in the inode. The storage and retrieval of the EAs in accordance with the different examples is further described with reference to FIGS. 1(b)-1(d) below.

Figure 1B:
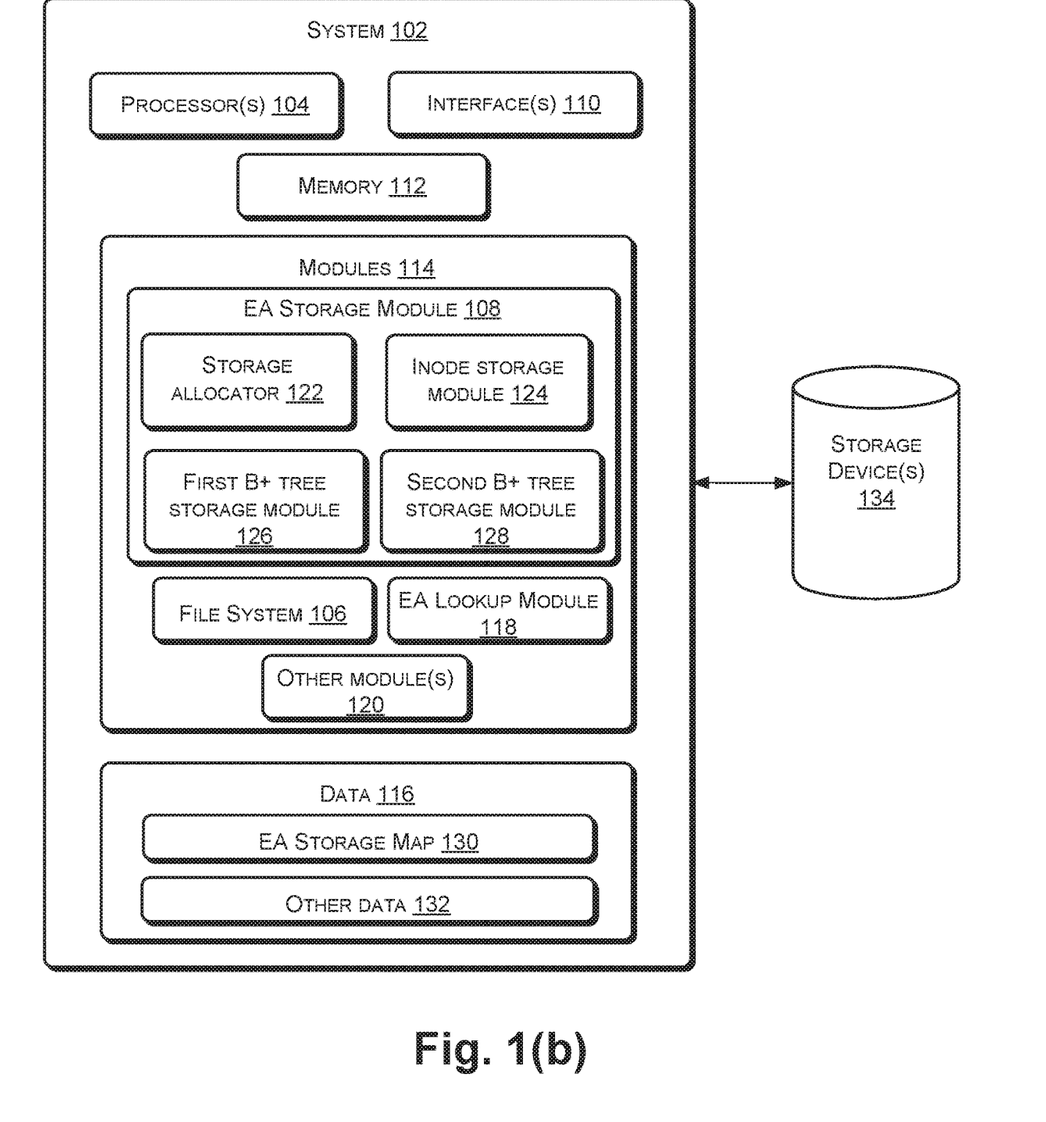
FIG. 1(b) illustrates an example system for extended attribute storage in detail, in accordance with an example of the present subject matter.
Figure 1C:
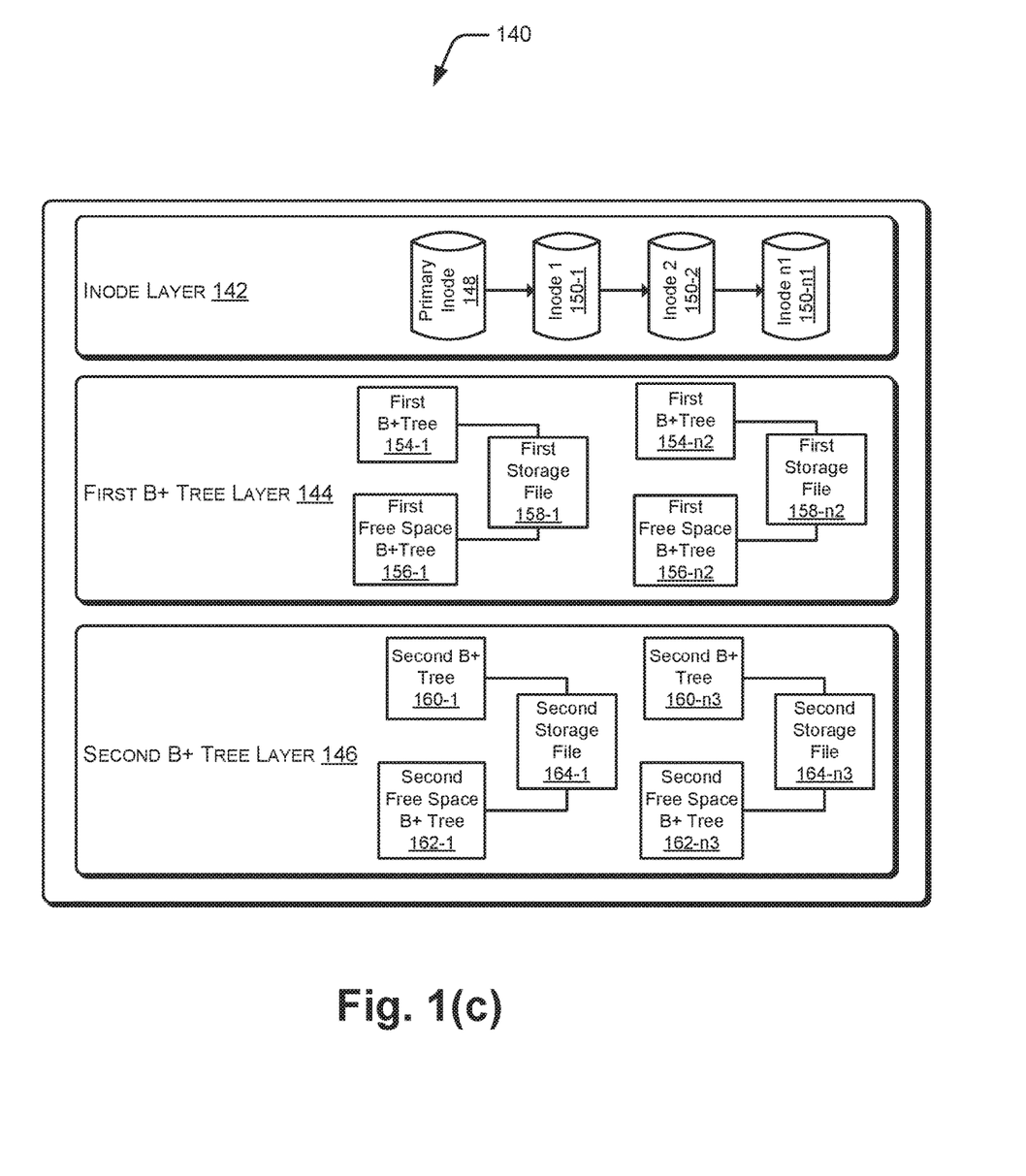
FIG. 1(c) illustrates an example multi-layer extended attribute storage framework, in accordance with an example of the present subject matter.
Figure 1D:
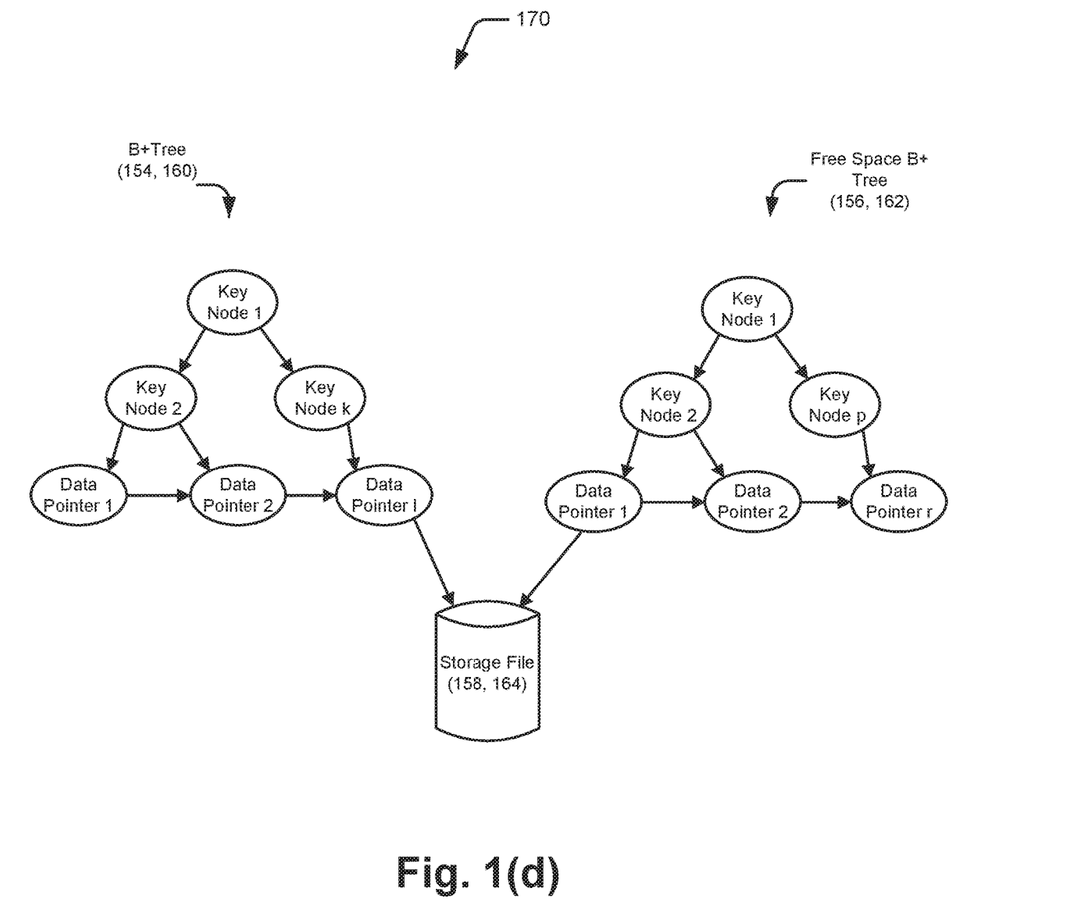
FIG. 1(d) illustrates an example B+ tree architecture implemented for extended attribute storage, in accordance with an example of the present subject matter.

FIG. 1(b) illustrates in detail an example system 102 for extended attribute storage, in accordance with an example of the present subject matter, while FIGS. 1(c) and 1(d) illustrate an example multi-layer EA storage framework and an example B+ tree architecture implemented for extended attribute storage, respectively. FIGS. 1(b), 1(c), and 1(d) are described in conjunction with each other for clarity.

As discussed earlier, the system 102 can include the processor 104. Further, as shown in FIG. 1(b), the system 102 can include interface(s) 110. The interface(s) 110 may include a variety of computer readable instruction-based and hardware-based interfaces that allow the system 102 to interact with other devices, including storage devices and display devices. Further, the interface(s) 110 may enable the system 102 to communicate with other communication devices, such as network entities, over a communication network.

Further, the system 102 includes memory 112, coupled to the processor(s) 104. The memory 112 may include any non-transitory computer-readable medium, for example, volatile memory, e.g., RAM, and/or non-volatile memory, e.g., EPROM, flash memory, etc.

The memory 112 can include or be coupled to module(s) 114 and data 116. The module(s) 114 may be coupled to the processor(s) 104. The module(s) 114, amongst other things, includes routines, programs, objects, components, data structures, and the like, which perform particular tasks or implement particular abstract data types. In one implementation, the module(s) 114 can include the file system 106, the EA storage module 108, an EA lookup module 118, and other modules 120. The EA storage module 108 may further include a storage allocator 122, an inode storage module 124, a first B+ tree storage module 126, and a second B+ tree storage module 128. The other module(s) 120 further include modules that supplement applications on the system 102, for example, modules of an operating system and various other applications.

The data 116 serves, amongst other things, as a repository for storing data that may be fetched, processed, received, or generated by the module(s) 114. In one implementation, the data 116 can include EA storage map 130 and other data 132. The EA storage map 130 can include a map of characteristics of EAs and corresponding storage location. For example, the EA storage map 130 can include names of EAs to be stored using the first B+ tree, names of EAs to be stored in the inode, storage locations corresponding to the user defined characteristic, and the like. The other data 132 can correspond to other data generated or used by the modules 114.

Although the data 116 is shown internal to the system 102, it may be understood that the data 116 can reside in an external repository (not shown in the figures), which may be coupled to the system 102. The system 102 may communicate with the external repository through the interface(s) 110 to obtain information from the data 116.

Further, as mentioned earlier, the system 102 can communicate with storage device(s) 134 to manage the storage of file system objects and metadata including EAs on the storage device(s) 134 using the file system 106. While not illustrated herein, it will be understood that the system 102 can communicate with the storage device(s) 134, either directly or over a network.

In operation, when the file system 106 is created, the file system 106 may create a multi-layer storage framework 140 including an inode layer 142, a first B+ tree layer 144, and a second B+ tree layer 146, as shown in FIG. 1(c). The inode layer 142 can include a primary inode 148 and secondary inodes 150-1, 150-2, . . . 150-n1, collectively referred to as secondary inodes 150. The number and sizes of secondary inodes 150 co-located with the primary inode 148 may be defined, for example, by a user, such as a system administrator.

Further, the first B+ tree layer 144 can include multiple first B+ trees, each corresponding to an EA name that is to be de-duplicated across the file system. Thus, each first B+ tree includes values of the corresponding EA name for multiple file system objects and allows de-duplication of the values at a file system object level. For example, the first B+ tree layer 144 can include a first B+ tree 154-1 associated with a first free space B+ tree 156-1 and a first storage file 158-1, . . . , and a first B+ tree 154-n2 associated with a first free space B+ tree 156-n2 and a first storage file 158-n2. Individually, the components of the first B+ tree layer are referred to as first B+ tree 154, first free space B+ tree 156, and first storage file 158.

Similarly, the second B+ tree layer 146 can include multiple second B+ trees. However, each second B+ tree can correspond to a file system object and can have EAs of the file system object that are not stored in the inode layer 142 or first B+ tree layer 144. Thus, each second B+ tree includes EA names and values for a particular file system object. For example, the second B+ tree layer 146 can include a second B+ tree 160-1 associated with a second free space B+ tree 162-1 and a second storage file 164-1, . . . , and a second B+ tree 160-n3 associated with a second free space B+ tree 162-n3 and a second storage file 164-n3. Individually, the components of the second B+ tree layer 146 are referred to as second B+ tree 160, second free space B+ tree 162, and second storage file 164.

While the first B+ tree layer 144 and the second B+ tree layer 146 may have similar B+ tree architecture 170 as shown in FIG. 1(d), the traversal of the B+ tree architecture 170 and storage and retrieval of the EAs in the first B+ tree layer 144 and the second B+ tree layer 146 would be different as discussed later below. For illustration purposes, the first B+ tree 154 and the second B+ tree 160 are collectively represented as B+ tree (154, 160) in FIG. 1(d). Similarly the first free space B+ tree 156 and the second free space B+ tree 162 are collectively represented as free space B+ tree (156, 162), and the first storage file 158 and the second storage file 164 are collectively represented as storage file (158, 164) in FIG. 1(d).

As is illustrated in FIG. 1(d), the B+ tree (154, 160) includes key nodes 1 to k that store keys and leaf nodes 1 to l that store data pointers. The keys can be used to retrieve EA values from the storage file (158, 164) using the data pointers. The free space B+ tree (156, 162) can be used to track and manage free spaces in the storage file (158, 164) using key nodes 1 to p and data pointers 1 to r.

In one example, in case of a first B+ tree 154, which corresponds to a particular EA name, each key can correspond to a de-duplicated hash value of an EA value associated with a file system object for the particular EA name. In one example, the hash value of an EA value can be an 8 KB value determined using a hash function. In another example, the hash value can be a 4 KB value.

In another example, in case of a second B+ tree 160, which corresponds to a particular file system object, each key can correspond to a hash value of an EA name of the EA of the particular file system object. In one example, the hash value of an EA name can be an 8 KB value determined using a hash function. In another example, the hash value can be a 4 KB value.

Each data pointer in the B+ tree (154, 160) can indicate the offset at which an EA value corresponding to one of the key nodes is stored in the storage file (158, 164). In one example, the storage file (158, 164) can be a flat file or sequential file. In this example, the storage file (158, 164) can store EAs contiguously with each EA stored as a key-value pair appended to a header, where the key in the key-value pair is the EA name. The header can indicate the size of the appended key-value pair and can thus provide information for traversing the EAs.

Further, to manage the free spaces in the storage file (158, 164) and for determining free spaces for storing an EA in the B+ tree architecture 170, the free space B+ tree (156, 162) can be used. The free space B+ tree (158, 162) can be indexed by the lengths of the free spaces as the key nodes 1-$p$ and each of the data pointers in the leaf nodes 1-$r$ can indicate the offset at which the corresponding free space starts.

Continuing with the operation of the file system 106 with reference to FIG. 1($b$), upon creation of the multi-layer storage framework 140, the file system 106 can also define the EA storage map 130 that includes a mapping between one or more EA characteristics and corresponding storage location in the multi-layer storage framework 140. For example, the file system 106 can define the EA storage map 130 using input/output (I/O) calls. In one example, the EA storage map 130 may also be defined based on inputs received by the file system 106 from a user, such as a system administrator.

Further, when a request to store an EA for a file system object is received by the file system 106, the file system 106 can pass the request to the EA storage module 108. In one example, the storage allocator 122 in the EA storage module 108 can determine the storage location based on one or more characteristics of the EA using the EA storage map 130. In one example, the storage allocator 122 can determine, based on the name of the EA or the user defined characteristic, whether the EA is to be stored using the first B+ tree 154-1. On making a positive determination, the storage allocator 122 can provide the EA to the first B+ tree storage module 126 that can implement a de-duplication mechanism for storing the EA in the first storage file 158-1 using the first B+ tree 154-1. Similarly, the storage allocator 122 can determine, based on the name of the EA or the user defined characteristic, whether the EA is to be stored in an inode from amongst the secondary inodes 150 or the primary inode 148. On making a positive determination, the storage allocator 122 can provide the EA to the inode storage module 124.

Further, in case the storage allocator 122 does not make a positive determination for storing the EA either in the inode or in the first storage file 158-1, the storage allocator 122 can determine whether the EA name exists in the second B+ tree 160-1 corresponding to the file system object. In case the EA name exists in the second B+ tree 160-1, the storage allocator 122 can provide the EA to the second B+ tree storage module 128 for updating the value of the EA in the second storage file 164-1. In case the EA name does not exist in the second B+ tree 160-1, the storage allocator 122 can determine whether to save the EA in the inode or in the second storage file 164-1 based upon a size criteria.

In one implementation, the size criteria can indicate that the EA is to be stored in the inode if the size of the EA is less than the predefined size of the inode and if the total size of the EA and existing EAs in the inode is less than the predefined size of the inode.

In one implementation, in case a user defined characteristic indicates that the EA is to be stored in the inode, the storage allocator 122 can check based on the size criteria whether the EA can be stored in the inode, and if not, the storage allocator 122 can determine that the EA is to be stored using the second B+ tree 160-1 and can accordingly provide the EA to the second B+ tree storage module 128 for storage.

Thus, based on the determination of the storage location by the storage allocator 122, the EA is provided to one of the inode storage module 124, the first B+ tree storage module 126, and the second B+ tree storage module 128 for storage.

In one example, when the inode storage module 124 receives the EA for storage for a file system object, the inode storage module 124 can store the EA as a key(name)-value pair in the inode that stores the metadata corresponding to that file system object.

In one example, when the first B+ tree storage module 126 receives the EA for storage for a file system object in the first B+ tree 154-1, the first B+ tree storage module 126 determines a hash value of the EA value and performs a search for the hash value in the key nodes of the first B+ tree 154-1. In case the hash value is found, the first B+ tree storage module 126 checks, using the corresponding data pointer, whether the EA value corresponding to the hash value as stored in the first storage file 158-1 is the same as the EA value to be stored. If it is the same, the first B+ tree storage module 126 increases a reference count of the EA value by one, thereby performing de-duplication and ensuring that duplicate EA values are not stored in the first storage file 158-1. In case the hash value is not found, the first B+ tree storage module 126 can create a new key node corresponding to the hash value in the first B+ tree 154-1 and can store the EA in the first storage file 158-1 at an offset location determined from the first free space tree 156-1. Further, the first B+ tree storage module 126 can create a new data pointer corresponding to the new key node in the first B+ tree 154-1 to indicate the offset location.

In case the hash value is found, but the corresponding EA value is not the same as the EA value to be stored, this indicates that a hash collision has occurred and the first B+ tree storage module 126 can increase the hash value by one and repeat the check for the existence of the hash value in the key nodes of the first B+ tree 154-1 until the collision is resolved. The hash collision can be understood to be resolved when either a key node having the same hash value and corresponding to the same EA value as the EA to be stored is found and its reference count is increased by one in the first storage file 158-1 or the hash value is not found and the EA is stored in the first storage file 158-1 with a new key node and corresponding data pointer in the first B+ tree 154-1.

Further, upon storage of the EA in the first storage file 158-1, the hash value with which the EA is stored is saved in the inode of the corresponding file system object against the EA name to enable subsequent retrieval of the EA value.

In one example, when the second B+ tree storage module 128 receives the EA for storage corresponding to a file system object, the second B+ tree storage module 128 determines a hash value of the EA name and checks if the hash value exists in the key nodes of the second B+ tree 160-1. In case the hash value exists, the second B+ tree storage module 128 determines, from the corresponding data pointer, the offset location in the second storage file 164-1 where the EA is stored and checks whether the EA name is the same as that of the EA to be stored. If the EA name is found to be the same, the second B+ tree storage module 128 updates the EA value. In case the hash value does not exist, the second B+ tree storage module 128 can create a new key node corresponding to the EA in the second B+ tree 160-1 and can store the EA in the second storage file 164-1 at an offset location determined from the second free space tree 162-1. Further, the second B+ tree storage module 128 can create a new data pointer corresponding to the new key node to indicate the offset location.

However, in case the hash value exists, but the EA name is not the same as the EA to be stored, then a hash collision is detected and is resolved by incrementing the hash value by one and repeating the process till either the same hash value with the same EA name is found or the same hash value is not found.

Thus, the second B+ tree storage module 128 does not have to perform de-duplication. Further, as the second B+ tree 160 is for a particular file system object and the key nodes correspond to the EA name, the hash value of the EA name stored by the second B+ tree storage module does not have to be stored in the inode of the corresponding file system object.

In one implementation, when the file system 106 receives a request to lookup an EA value for an EA of a file system object, the file system 106 provides the request to the EA lookup module 118. The EA lookup module 118 can determine, based on the EA storage map 130 and EA characteristic, whether the EA is stored in the inode or using the first B+ tree 154-1. In case the EA is found to be stored in the inode, the EA can be read from the inode of the file system object. In case the EA is found to be stored using the first B+ tree 154-1, the hash value of the EA value can be determined from the inode of the file system object and the EA value can be then determined by performing a lookup on the first B+ tree 154-1 using the hash value. In case the EA cannot be found in the location indicated by the EA storage map 130, then an error message may be returned indicating that the EA value does not exist.

In case the EA storage map 130 does not indicate a storage location of the EA, the EA lookup module 118 can perform a lookup on the inode of the file system object to determine if the EA is stored in the inode. In case the EA is not found, the EA lookup module 118 can compute the hash value of the EA name and can perform a lookup on the second B+ tree 160-1 using the hash value. Further, if the EA cannot be found using the hash value, then an error message may be returned indicating that the EA value does not exist.

Moreover, upon performing the lookup, if the EA is to be deleted, then, if the EA is found in the inode, the EA can be directly deleted. If the EA is found in the first B+ tree 154, then the reference count of the EA can be reduced by one until it reaches zero. Upon the reference count reaching zero, the corresponding key node can be deleted, corresponding header in the first storage file 158 can be marked as deleted, and an entry can be made in the first free space tree 156 indicating that the space is free. In case the EA is to be deleted from the second B+ tree 160, the corresponding key node can be deleted from the second B+ tree 160, the corresponding header in the second storage file 164 can be marked as deleted and an entry can be made in the second free space tree 162 indicating that the space is free.

Thus, various aspects of the present subject matter allow the extended attributes to be stored and retrieved in a manner that is scalable, efficient, and has reduced data latency.

FIGS. 2-5 illustrate example methods 200, 300, 400, and 500 for storing extended attributes pertaining to a file system object, according to various aspects of the present subject matter. The order in which the methods 200-500 are described is not intended to be construed as a limitation, and some of the described method blocks can be combined in a different order to implement the methods 200-500, or an alternative method. Additionally, individual blocks may be deleted from the methods 200-500 without departing from the subject matter described herein. Furthermore, the methods 200-500 may be implemented in any suitable hardware, computer-readable instructions, or combination thereof.

The methods 200-500 may be performed by either a computing device under the instruction of machine executable instructions stored on a non-transitory computer readable medium or by dedicated hardware circuits, microcontrollers, or logic circuits. The non-transitory computer readable medium can include media, for example, digital data storage media, which are machine or computer readable and encode machine-executable or computer-executable instructions, where said instructions perform some or all of the blocks of the described methods 200-500. In one example, the methods 200-500 may be performed by the system 102 as described above with reference to FIGS. 1(*a*)-1(*d*).

Figure 2:
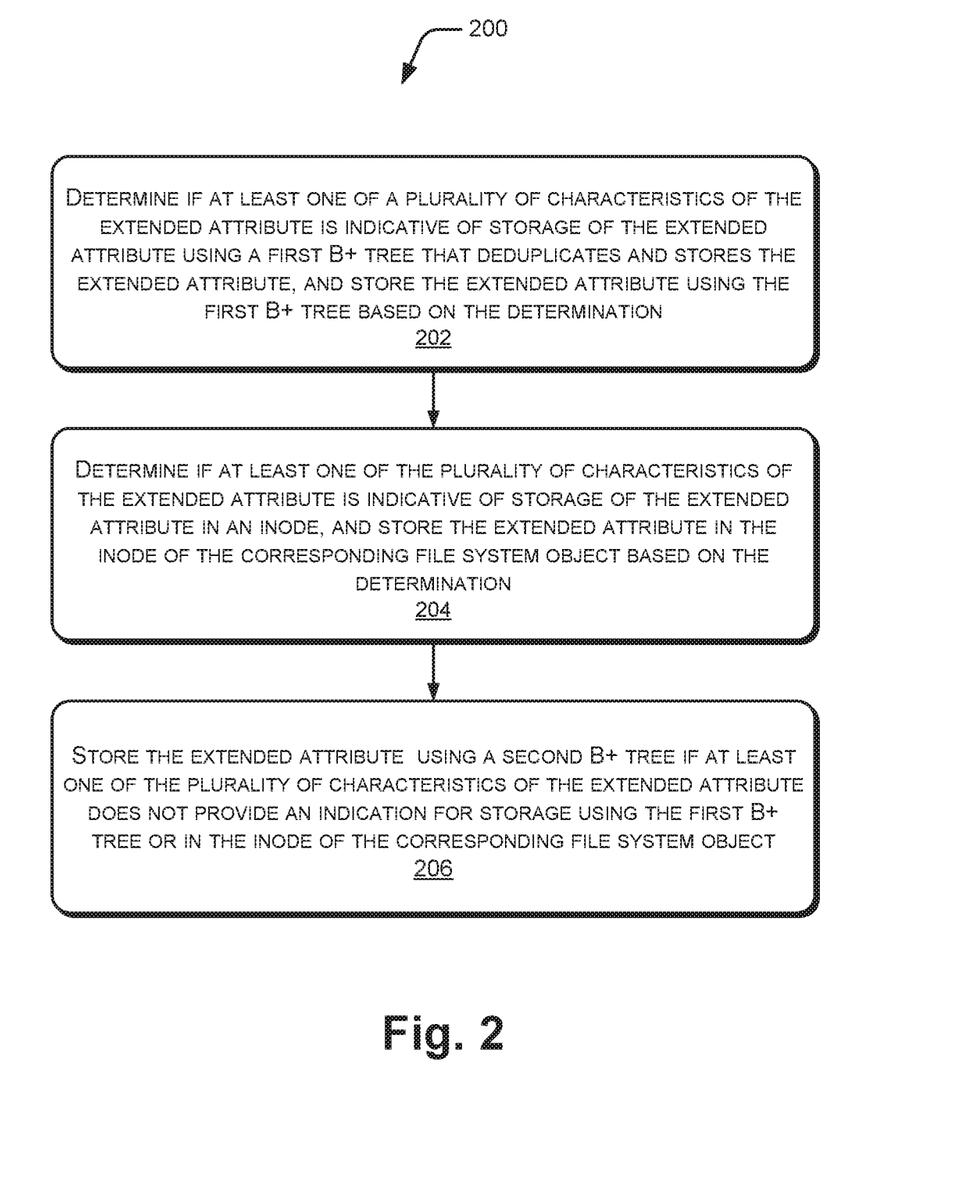
FIG. 2 illustrates an example method for extended attribute storage, in accordance with an example of the present subject matter.

FIG. 2 illustrates an example method 200 for extended attribute storage, in accordance with an example of the present subject matter.

At block 202 it is determined if at least one of a plurality of characteristics of the extended attribute is indicative of storage of the extended attribute using a first B+ tree that de-duplicates and stores the extended attribute, and the extended attribute is stored using the first B+ tree based on the determination. For example, if the storage allocator 122 determines from the EA storage map 130, based on an EA name or a user defined characteristic, that the EA is to be stored using a first B+ tree 154, then the first B+ tree storage module 126 de-duplicates and stores the EA in the first storage file 158 using the first B+ tree 154.

At block 204 it is determined if at least one of the plurality of characteristics of the extended attribute is indicative of storage of the extended attribute in an inode, and the extended attribute is stored in the inode of the corresponding file system object based on the determination. For example, if the storage allocator 122 determines from the EA storage map 130, based on an EA name or a user defined characteristic, that the EA is to be stored in an inode, then the inode storage module 124 stores the EA in the one of the secondary inodes 150.

At block 206 the extended attribute is stored using a second B+ tree if at least one of the plurality of characteristics of the extended attribute does not provide an indication for storage using the first B+ tree or in the inode of the corresponding file system object. For example, if the storage allocator 122 determines that the EA is to be stored using the second B+ tree 160, then the second B+ tree storage module 128 stores the EA in the second storage file 164 using the second B+ tree 160.

Figure 3:
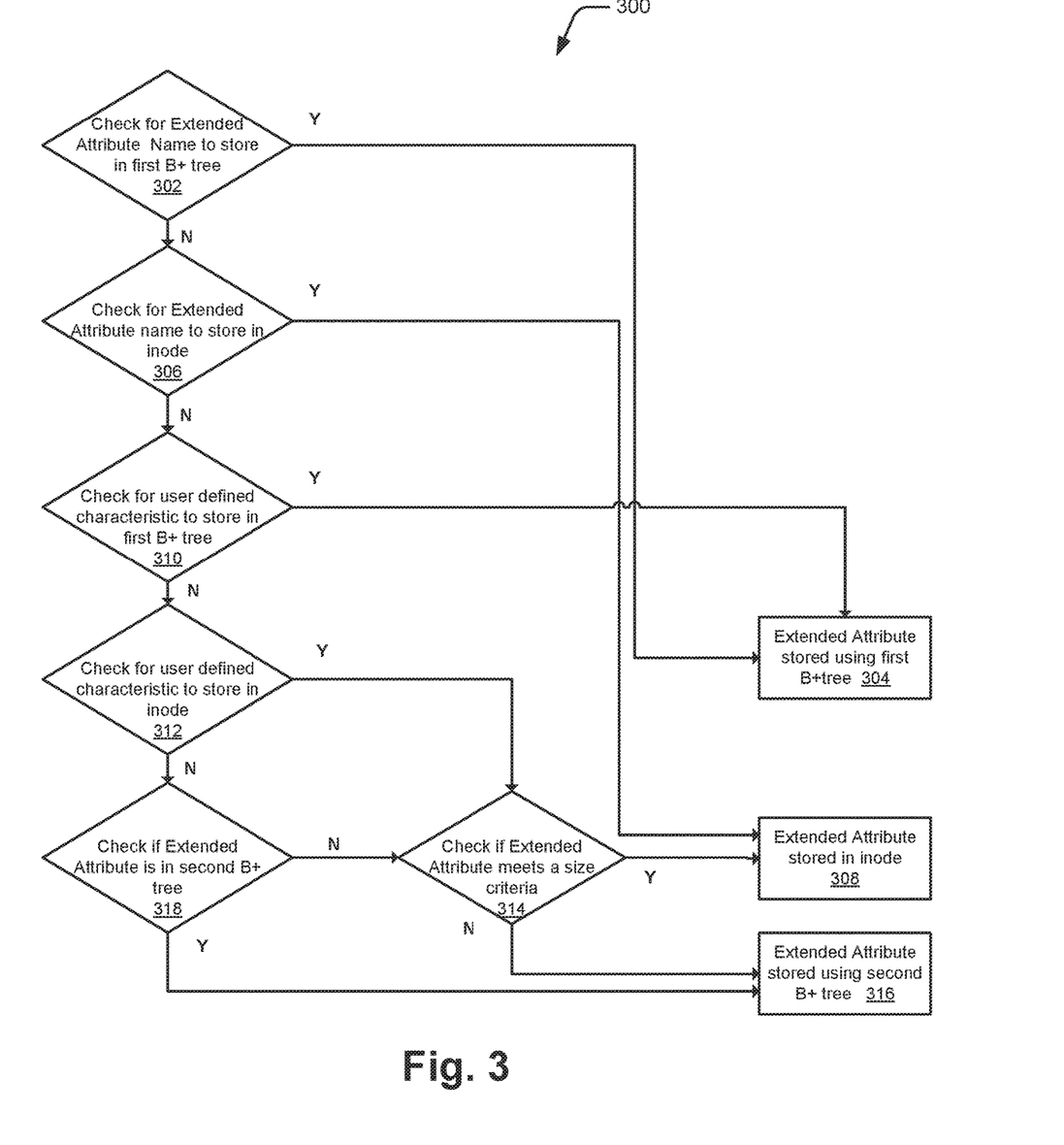
FIG. 3 illustrates another example method for extended attribute storage, in accordance with an example of the present subject matter.

FIG. 3 illustrates another example method 300 for extended attribute storage, in accordance with an example of the present subject matter.

At block 302, it is checked, for example, by the storage allocator 122, if an EA name indicates that the EA is to be stored using a first B+ tree and if "yes", then the EA is stored using the first B+ tree, for example, by the first B+ tree storage module 126 at block 304.

The "no" branch from the block 302 continues to block 306, where it is checked, for example, by the storage allocator 122, if the EA name indicates that the EA is to be stored in an inode and if "yes", then the EA is stored in the inode, for example, by the inode storage module 124, at block 308.

The "no" branch from the block 306 continues to block 310, where it is checked, for example, by the storage allocator 122, if a user defined characteristic indicates that the EA is to be stored using a first B+ tree and if "yes", then the EA is stored using the first B+ tree, for example, by the first B+ tree storage module 126, at block 304.

Further, the "no" branch from block 310 proceeds to block 312, where it is checked, for example, by the storage allocator 122, if the user defined characteristic indicates that the EA is to be stored in an inode. If "yes", then the method proceeds to block 314 where it is checked, for example, by the storage allocator 122, if the EA meets a size criteria to be stored in the inode. In one example, the size criteria can indicate that the EA is to be stored in the inode if the size of the EA is less than the predefined size of the inode and if the total size of the EA and existing EAs in the inode is less than the predefined size of the inode.

Further, if the EA meets the size criteria, then the EA is stored in the inode, for example, by the inode storage module 124, at block 308. Else, the "no" branch from block 314 proceeds to block 316, where the EA is stored using a second B+ tree, for example, by the second B+ tree storage module 128.

Also, from block 312, if the user defined characteristic does not indicate that the EA is to be stored in an inode, the method proceeds to block 318 where it is checked, for example, by the storage allocator 122, if the EA exists in the second B+ tree. If "yes", the method proceeds to block 316 to store the EA in the second B+ tree, for example, by the second B+ tree storage module 128. If "no", the method proceeds to block 314 to check, for example, by the storage allocator 122, if the EA meets the size criteria and proceeds accordingly as mentioned above.

Figure 4:
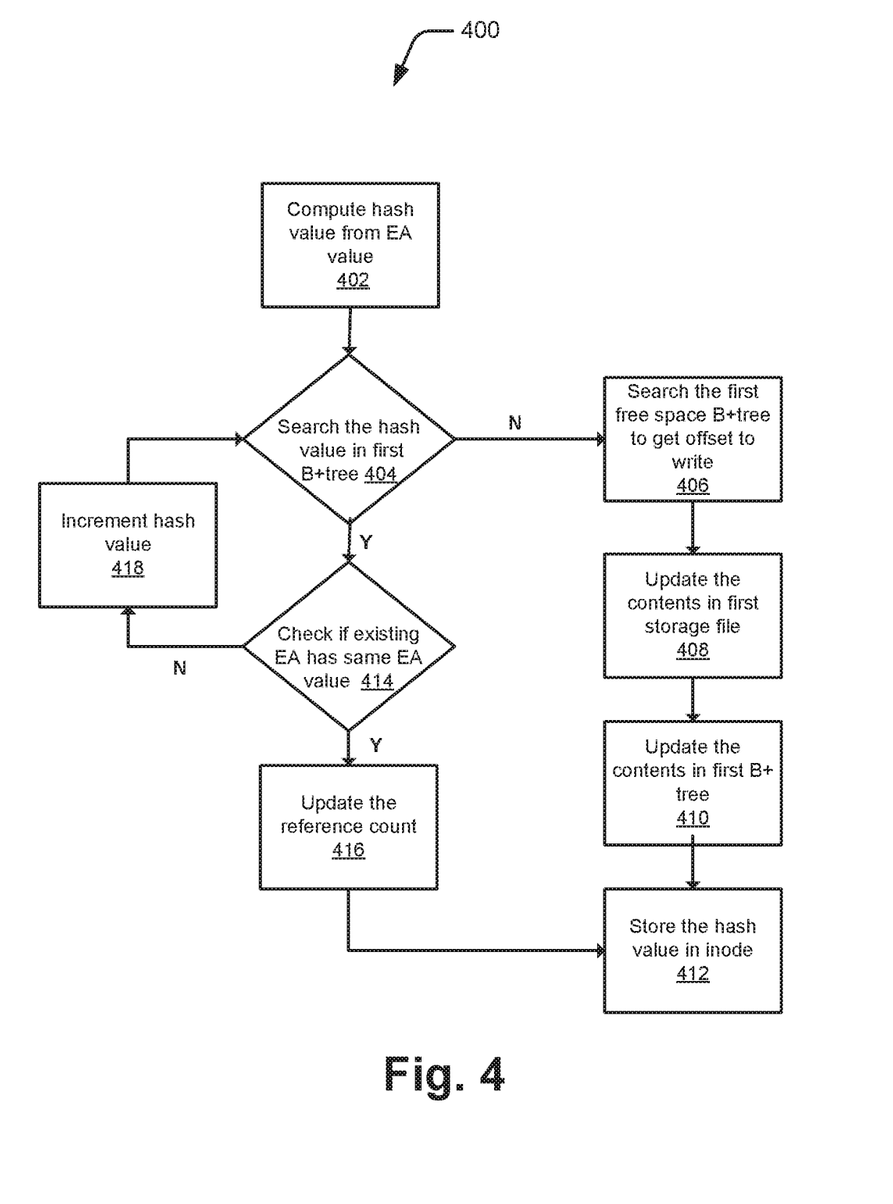
FIG. 4 illustrates an example method for extended attribute storage in a first B+ tree, in accordance with an example of the present subject matter.

FIG. 4 illustrates an example method 400 for extended attribute storage in a first B+ tree, in accordance with an example of the present subject matter. As mentioned earlier, the first B+ tree stores EA values corresponding to a particular EA name for different file system objects. For example, there may be a first B+ tree for EA name "author", which can de-duplicate and store the names of authors of different file system objects. Similarly, there may be a first B+ tree for EA name "access control list", which can de-duplicate and store the access control lists of different file system objects. In one example, the method 400 can be performed by the first B+ tree storage module 126 when the storage allocator 122 determines that an EA of a file system object is to be stored using a first B+ tree 154-1.

At block 402, a hash value is computed from the EA value and at block 404 the first B+ tree 154-1 is traversed to search for the hash value. If the hash value is not found, then at block 406, the first B+ free space tree 156-1 is searched to obtain a storage file offset for writing the EA. At block 408, the EA is written at the offset in the first storage file 158-1, and at block 410, the first B+ tree 154-1 is updated by creating a new key node and a new data pointer corresponding to the hash value and offset, respectively. Further, at block 412, the hash value is stored in the inode of the file system object against the EA name for subsequent lookup.

However, at block 404, if the hash value is found in the first B+ tree 154-1, then it is checked at block 414 if the EA value corresponding to the hash value in the first storage file 158-1 is the same as the EA value of the EA to be stored. If the two EA values are the same, then the reference count of the EA is incremented by one in the first storage file 158-1 at block 416 and the method proceeds to block 412, where the hash value is stored in the inode of the file system object against the EA name for subsequent lookup. If however, at block 414, it is found that the EA values are not the same, it indicates that a hash collision has occurred. In this case, the method proceeds to block 418 where the hash value is incremented by one and the method from block 404 is performed again.

Figure 5:
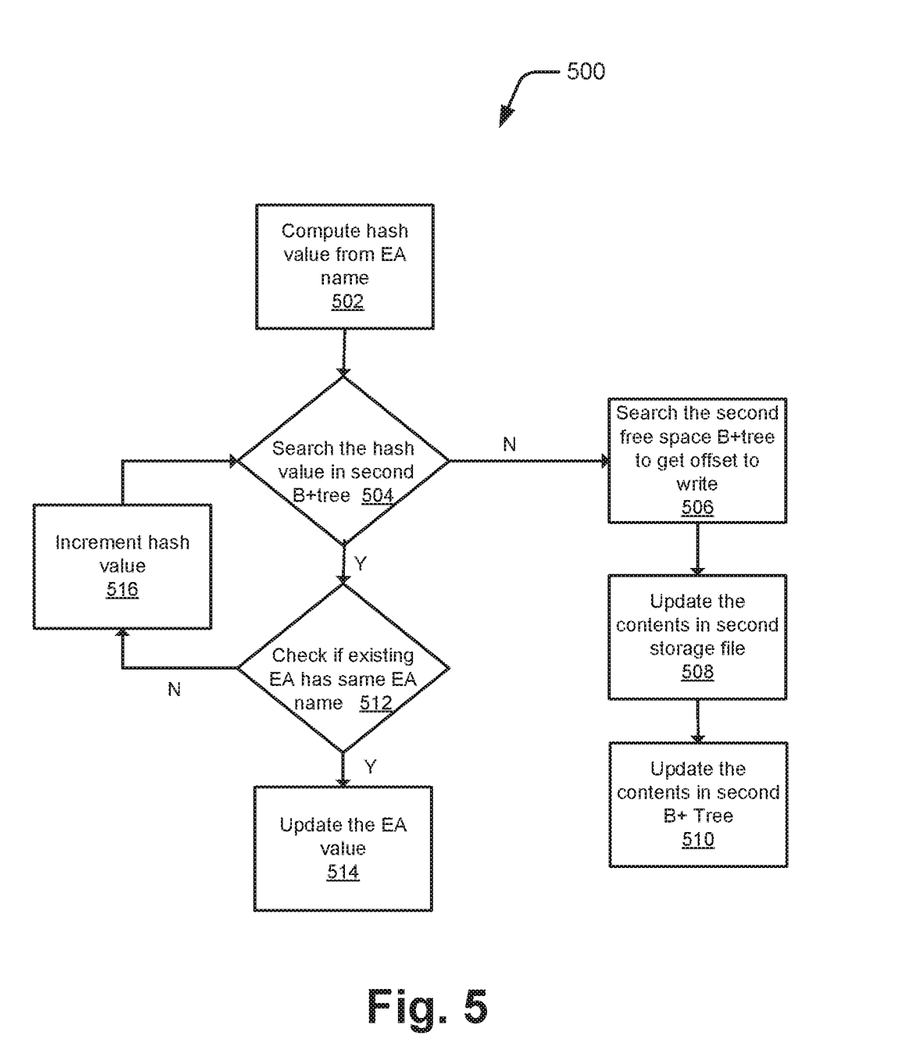
FIG. 5 illustrates an example method for extended attribute storage in a second B+ tree, in accordance with an example of the present subject matter.

FIG. 5 illustrates an example method 500 for extended attribute storage in a second B+ tree, in accordance with an example of the present subject matter. As mentioned earlier, the second B+ tree stores EA values for different EAs of a particular file system object. For example, there may be a second B+ tree for file system object "File A", which can store a plurality of EAs corresponding to the "File A". Similarly, there may be a second B+ tree for file system object "File B", which can store a plurality of EAs corresponding to the "File B". In one example, the method 500 can be performed by the second B+ tree storage module 128 when the storage allocator 122 determines that an EA of a file system object is to be stored using a second B+ tree 160-1.

At block 502, a hash value is computed from the EA name and at block 504 the second B+ tree 160-1 is traversed to search for the hash value. If the hash value is not found, then at block 506, the second free space B+ tree 162-1 is searched to obtain a storage file offset for writing the EA. At block 508, the EA is written at the offset in the second storage file 164-1, and at block 510, the second B+ tree 160-1 is updated by creating a new key node and a new data pointer corresponding to the hash value and offset, respectively.

However, at block 504, if the hash value is found in the second B+ tree 160-1, then it is checked at block 512 if the EA name corresponding to the hash value in the second storage file 164-1 is the same as the EA name of the EA to be stored. If the two EA names are the same, then the EA value is updated in the second storage file 164-1 at block 514.

If, however, at block 512, it is found that the EA names are not the same, it indicates that a hash collision has occurred. In this case, the method proceeds to block 516 where the hash value is incremented by one and the method from block 504 is performed again.

Figure 6:
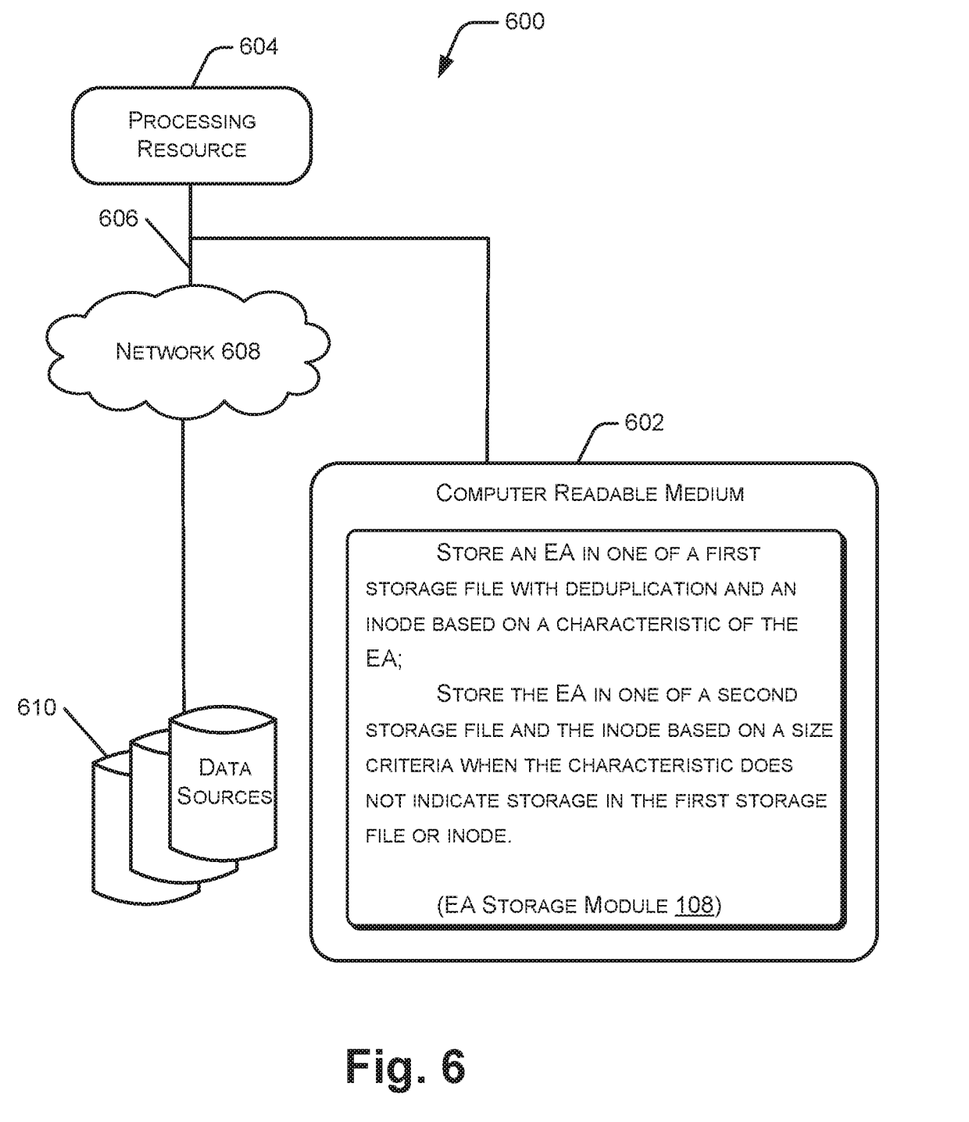
FIG. 6 illustrates an example computing environment, implementing a non-transitory computer-readable medium for extended attribute storage, according to an example of the present subject matter.

FIG. 6 illustrates an example computing environment 600, implementing a non-transitory computer-readable medium 602 for extended attribute storage, according to an example of the present subject matter.

In one implementation, the non-transitory computer readable medium 602 may be utilized by a computing system, such as the system 102 (not shown in this figure). In one implementation, the computing environment 600 may include a processing resource 604, such as the processor 104, communicatively coupled to the non-transitory computer readable medium 602 through a communication link 606.

The computer readable medium 602 may be, for example, an internal memory device or an external memory device. In one implementation, the communication link 606 may be a direct communication link, such as any memory read/write interface. In another implementation, the communication link 606 may be an indirect communication link, such as a network interface. In such a case, the processing resource 604 may access the computer readable medium 602 through a network 608. The network 608 may be a single network or a combination of multiple networks and may use a variety of different communication protocols.

The processing resource 604 and the computer readable medium 602 may also communicate with various data sources 610, such as the storage devices 134, either directly or over the network 608. In one implementation, the computer readable medium 602 includes a set of computer readable instructions, such as instructions corresponding to functionalities provided by the EA storage module 108. Additionally, the computer readable medium 602 may also include instructions corresponding to functionalities provided by the file system 106 and the EA lookup module 118. The set of computer readable instructions may be accessed by the processing resource 604 through the communication link 606 and subsequently executed.

For example, the processing resource 604 may execute the instructions to receive a request for storing the EA and determine if a characteristic of the EA indicates one of a de-duplicated storage in a first storage file and storage in an inode. The characteristic of the EA can include a name of the EA and a user defined characteristic. Further, the processing resource 604 may execute the instructions to store the EA in one of the first storage file with de-duplication and the inode based on the determination. The first storage file is accessible by a first B+ tree. Moreover, the processing resource 604 may execute the instructions to store the EA in one of a second storage file and an inode based on a size criteria if the characteristic of the EA does not indicate one of the de-duplicated storage in the first storage file and the storage in the inode. The second storage file is accessible by a second B+ tree.

In one example, the size criteria includes determining if a size of the EA is less than a predefined size of the inode and if a total size of the EA and existing EAs in the inode is less than the predefined size of the inode.

In one example, the processing resource 604 may execute the instructions to store the EA in the first storage file with de-duplication by incrementing the reference count of the EA in the first storage file by one upon identifying that an existing EA having the same hash value and EA value as the EA to be stored exists in the first storage file.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

We claim:

1. A system comprising:
   a processor;
   a file system coupled to the processor to receive a request for storage of an extended attribute (EA) of a file system object; and
   a non-transitory computer readable medium coupled to the processor and storing instructions that, when executed, cause the processor to:
   determine a storage location for the EA from a plurality of storage locations, based on one or more characteristics of the EA and based on at least one of an EA storage map that indicates the storage location based on the characteristics of the EA and a size criteria that is based on a size of the EA and a predefined size of the inode, wherein the plurality of storage locations include an inode, a first storage file accessible by a first B+ tree, and a second storage file accessible by a second B+ tree;
   store the EA in the inode, based on the determined storage location;
   de-duplicate and store the EA in the first storage file using the first B+ tree, based on the determined storage location; and
   store the EA in the second storage file using the second B+ tree, based on the determined storage location.

2. The system as claimed in claim 1, wherein the inode is one of a plurality of secondary inodes co-located with a primary inode, wherein a number of the secondary inodes and a size of each of the secondary inodes are predefined.

3. The system as claimed in claim 1, wherein the characteristics of the EA comprise at least one of a name of the EA, a user defined characteristic indicative of the storage location, and a size of the EA.

4. The system as claimed in claim 1, wherein the instructions, when executed, cause the processor to de-duplicate and store the EA in the first storage file by increasing a reference count of an existing EA in the first storage file when the existing EA has the same hash value and EA value as the EA to be stored.

5. The system as claimed in claim 1, wherein the instructions, when executed, cause the processor to determine the storage location in which the EA is stored based on the one or more characteristics of the EA and determine an EA value corresponding to the EA from the storage location.

6. A method of storing an extended attribute (EA) corresponding to a file system object managed by a file system, the method comprising:
   determining if at least one of a plurality of characteristics of the extended attribute is indicative of storage of the extended attribute using a first B+ tree that de-duplicates and stores the extended attribute, and storing the extended attribute using the first B+ tree based on the determination;
   determining if at least one of the plurality of characteristics of the extended attribute is indicative of storage of the extended attribute in an inode, and storing the extended attribute in the inode of the file system object based on the determination; and
   storing the extended attribute using a second B+ tree if at least one of the plurality of characteristics of the extended attribute does not provide an indication for storage using the first B+ tree or in the inode of the file system object.

7. The method as claimed in claim 6, wherein the storing the extended attribute using the first B+ tree comprises:
   determining a hash value of a value of the EA to be stored;
   determining, from the first B+ tree, if a key node having an identical hash value exists;
   determining whether a corresponding EA value of the key node having the identical hash value is identical to the value of the EA to be stored; and
   incrementing a reference count of the corresponding EA value by one when found to be identical to the value of the EA to be stored.

8. The method as claimed in claim 7, further comprising:
   incrementing the hash value of the value of the EA by one when the corresponding EA value of the key node having the identical hash value is not identical to the value of the EA to be stored; and
   determining, from the first B+ tree, if another key node having an identical hash value to the incremented hash value exists.

9. The method as claimed in claim 7, further comprising:
   adding a new key node corresponding to the value of the EA to be stored if a key node having the identical hash value does not exist;
   determining, from a first free space B+ tree, an offset location at which the EA is to be stored in a first storage file associated with the first B+ tree; and
   storing the EA, as a key-value pair appended to a header, in the first storage file at the offset location.

10. The method as claimed in claim 6, wherein the storing the extended attribute using the second B+ tree comprises:
    determining a hash value of a name of the EA;

determining, from the second B+ tree, if a key node having an identical hash value and identical EA name exists;

updating an EA value corresponding to the key node in a second storage file when the identical hash value and the identical EA name exists; and storing the EA, as a key-value pair appended to a header, with a new key node when the identical hash value does not exist.

11. A non-transitory computer-readable medium comprising instructions for storing an extended attribute (EA) of a file system object managed by a file system, the instructions being executable by a processing resource to:

receive a request for storing the EA;

determine if a characteristic of the EA indicates one of a de-duplicated storage in a first storage file and storage in an inode, wherein the characteristic of the EA includes a name of the EA and a user defined characteristic, and wherein the first storage file is accessible by a first B+ tree;

store the EA in one of the first storage file with de-duplication and the inode based on the determination; and store the EA in one of a second storage file and the inode based on a size criteria, if the characteristic of the EA does not indicate one of the de-duplicated storage in the first storage file and the storage in the inode, wherein the second storage file is accessible by a second B+ tree.

12. The non-transitory computer-readable medium of claim 11, wherein the size criteria includes determining if a size of the EA is less than a predefined size of the inode and if a total size of the EA and existing EAs in the inode is less than the predefined size of the inode.

13. The non-transitory computer-readable medium of claim 11, wherein the instructions to store the EA in the first storage file with de-duplication comprise instructions to increment a reference count of the EA in the first storage file by one upon identifying that an existing EA having the same hash value and EA value as the EA to be stored exists in the first storage file.

14. The system as claimed in claim 1, wherein the instructions that cause the processor to de-duplicate and store the EA in the first storage file using the first B+ tree include instructions to cause the processor to:

determine a hash value of an EA value of the EA to be stored;

determine, from the first B+ tree, if a key node having an identical hash value to that of the EA value exists;

determine whether a corresponding EA value of the key node having the identical hash value is identical to the EA value of the EA to be stored; and increment a reference count of the corresponding EA value by one when determined to be identical to the EA value of the EA to be stored.

15. The system as claimed in claim 1, wherein the instructions that cause the processor to store the EA in the second storage file using the second B+ tree include instructions to cause the processor to:

determine a hash value of a name of the EA;

determine, from the second B+ tree, if a key node exists with an identical hash value to that of the name of the EA and an identical EA name to that of the EA;

update an EA value corresponding to the key node in a second storage file in response to a determination that the key node exists with identical hash value and identical EA name; and store the EA, as a key-value pair appended to a header, with a new key node in response to a determination that no key node exists with the identical hash value.

16. The system as claimed in claim 1, wherein the size criteria includes whether the size of the EA is less than the predefined size of the inode and if a total size of the EA and existing EAs in the inode is less than the predefined size of the inode.

* * * * *